US008210672B2

(12) United States Patent
Mukai et al.

(10) Patent No.: US 8,210,672 B2
(45) Date of Patent: Jul. 3, 2012

(54) PRINTING METHOD USING INKJET RECORDING METHOD AND PRINTING APPARATUS

(75) Inventors: Hiroshi Mukai, Shiojiri (JP); Hidehiko Komatsu, Chino (JP); Hiroshi Ito, Shiojiri (JP); Hitoshi Ohta, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 500 days.

(21) Appl. No.: 12/471,558

(22) Filed: May 26, 2009

(65) Prior Publication Data

US 2009/0295847 A1 Dec. 3, 2009

(30) Foreign Application Priority Data

May 28, 2008 (JP) ................................ 2008-139053

(51) Int. Cl.
*C09D 11/02* (2006.01)

(52) U.S. Cl. ............ 347/100; 347/95; 347/98; 523/160

(58) Field of Classification Search ............ 347/95–100, 347/102; 523/160, 161; 106/31.13, 31.6
See application file for complete search history.

(56) References Cited

U.S. PATENT DOCUMENTS

| | | | | |
|---|---|---|---|---|
| 6,059,407 | A * | 5/2000 | Komatsu et al. | 347/103 |
| 6,114,411 | A * | 9/2000 | Nakamura et al. | 523/161 |
| 6,176,912 | B1 * | 1/2001 | Kato et al. | 106/31.43 |
| 7,281,790 | B2 * | 10/2007 | Mouri et al. | 347/103 |
| 7,875,689 | B2 * | 1/2011 | Ikuno et al. | 526/317.1 |
| 2002/0009547 | A1 * | 1/2002 | Ito et al. | 427/337 |
| 2004/0202838 | A1 * | 10/2004 | Uerz et al. | 428/195.1 |
| 2005/0007432 | A1 * | 1/2005 | Kanaya et al. | 347/100 |
| 2005/0036021 | A1 * | 2/2005 | Ito et al. | 347/100 |
| 2005/0124726 | A1 * | 6/2005 | Yatake et al. | 523/160 |
| 2005/0176847 | A1 * | 8/2005 | Cagle | 523/160 |
| 2008/0028980 | A1 | 2/2008 | Aoki et al. | |
| 2008/0152825 | A1 | 6/2008 | Mukai et al. | |
| 2008/0152828 | A1 | 6/2008 | Mukai et al. | |
| 2008/0152877 | A1 | 6/2008 | Mukai et al. | |
| 2010/0086689 | A1 * | 4/2010 | Ohta | 427/256 |
| 2010/0086692 | A1 * | 4/2010 | Ohta | 427/256 |
| 2010/0103236 | A1 * | 4/2010 | Komatsu | 347/102 |
| 2010/0104758 | A1 * | 4/2010 | Komatsu | 427/265 |
| 2011/0200797 | A1 * | 8/2011 | Mukai et al. | 428/195.1 |
| 2011/0200798 | A1 * | 8/2011 | Mukai et al. | 428/195.1 |
| 2011/0200799 | A1 * | 8/2011 | Mukai et al. | 428/195.1 |
| 2011/0234682 | A1 * | 9/2011 | Ohta et al. | 347/20 |
| 2011/0234683 | A1 * | 9/2011 | Komatsu | 347/20 |

FOREIGN PATENT DOCUMENTS

| | | |
|---|---|---|
| JP | 2000-44858 | 2/2000 |
| JP | 2002-146255 | 5/2002 |
| JP | 2004-176057 | 6/2004 |
| JP | 2004-195451 | 7/2004 |
| JP | 2005-120181 | 5/2005 |
| JP | 2005-220352 | 8/2005 |
| JP | 2005-263967 | 9/2005 |
| JP | 2005-263969 | 9/2005 |
| JP | 2006-272933 | 10/2006 |
| JP | 2006-281538 | 10/2006 |
| JP | 2006-281568 | 10/2006 |
| JP | 2006-281570 | 10/2006 |
| JP | 2006-282822 | 10/2006 |
| JP | 2006-282823 | 10/2006 |
| JP | 2006-316243 | 11/2006 |
| JP | 2007-262272 | 11/2007 |
| JP | 2007-297586 | 11/2007 |
| JP | 2008-155523 | 7/2008 |
| JP | 2008-155524 | 7/2008 |

OTHER PUBLICATIONS

Patent Abstract of Japan Publication No. 2000-044858 Published Feb. 15, 2000.
Patent Abstract of Japan Publication No. 2002-146255 Published May 22. 2002.
Patent Abstract of Japan Publication No. 2004-176057 Published Jun. 24, 2004.
Patent Abstract of Japan Publication No. 2004-195451 Published Jul. 15, 2004.
Patent Abstract of Japan Publication No. 2005-120181 Published May 12, 2005.
Patent Abstract of Japan Publication No. 2005-220352 Published Aug. 18, 2005.
Patent Abstract of Japan Publication No. 2005-263967 Published Sep. 29, 2005.
Patent Abstract of Japan Publication No. 2005-263969 Published Sep. 29, 2005.
Patent Abstract of Japan Publication No. 2006-316243 Published Nov. 24, 2006.
English Patent Abstract of Japan Publication No. 2006-272933 Published Oct. 12, 2006.
English Patent Abstract of Japan Publication No. 2007-262272 Published Nov. 10, 2007.

* cited by examiner

*Primary Examiner* — Matthew Luu
*Assistant Examiner* — Rut Patel
(74) *Attorney, Agent, or Firm* — Ladas & Parry LLP

(57) ABSTRACT

An inkjet recording method, including printing with an ink including a chromatic ink, an achromatic ink, and a resin ink; the resin ink contains at least thermoplastic resin particles that are insoluble in water but compatible with water-soluble solvents for resins as well as water-soluble solvent for resins; the inks all contain a silicon surfactant and an acetylene glycol surfactant that has an HLB value equal to or less than 6; and the printing method includes a step of drying performed during and/or after printing.

6 Claims, No Drawings

PRINTING METHOD USING INKJET RECORDING METHOD AND PRINTING APPARATUS

BACKGROUND OF THE INVENTION

1. Technical Field

The present invention relates to a printing method using an inkjet recording method for printing on non-ink-absorptive and low-ink-absorption recording media and to a printing method using an inkjet recording method that is excellent in terms of image quality, resistance to abrasion, and discharge stability no matter how ink-absorptive recording media used therewith are.

2. Inventions of the Related Art

[Background Art]

Inkjet recording is a recording method in which ink droplets are jetted (discharged) so as to attach a recording medium, such as paper, for recording. Recent drastic advancements in inkjet recording technologies have put inkjet recording into practice also in recording (printing) of fine images, replacing silver halide photography and offset printing. This requires ink for inkjet recording to have some mandatory properties, for example, long-term stable discharge of droplets for resultant images having no defects.

An example of ink for inkjet recording is one proposed in Japanese Patent No. 3509013 (Patent Document 1), which is a pigment ink obtained as a combination of an acetyleneglycol surfactant, triethylene glycol monobutyl ether, 2-pyrrolidone, and a water-soluble organic solvent and is described as being favorable in terms of discharge stability and clogging reliability. Also, Japanese Unexamined Patent Application Publication No. 2005-120181 (Patent Document 2), Japanese Unexamined Patent Application Publication No. 2005-263967 (Patent Document 3), and Japanese Unexamined Patent Application Publication No. 2005-263969 (Patent Document 4) each propose a pigment ink containing a silicon surfactant and describe that the ink is excellent in terms of stability in serial printing and produces images having a reduced number of blurs. Furthermore, Japanese Unexamined Patent Application Publication No. 2006-316243 (Patent Document 5) proposes a pigment ink containing a fluorine surfactant and describes that the ink produces a reduced number of blurs and is favorable in discharge stability. All of these inks have been proposed as methods for printing on highly ink-absorptive recording media.

A printing method for producing images using an inkjet recording method on non-ink-absorptive and low-ink-absorption recording media is proposed in Japanese Unexamined Patent Application Publication No. 2000-44858 (Patent Document 6), which proposes an ink containing water, a glycol-based solvent, an insoluble colorant, a polymer dispersant, a silicon surfactant and a fluorine surfactant, a water-insoluble graft copolymer binder, and N-methyl pyrrolidone as a method for printing on hydrophobic base materials. Also, Japanese Patent No. 3937170 (Patent Document 7) proposes an ink composed of an aqueous emulsion polymer having a glass transition temperature in the range of 40° C. to 80° C., a pigment, and a water-soluble surface agent selected from a monoalkylether of an alkylene glycol, 2-pyrrole, N-methylpyrrolidone, and sulfolane as a method for providing images on hydrophobic surfaces. Japanese Unexamined Patent Application Publication No. 2005-220352 (Patent Document 8) proposes a polymer-colloid-containing inkjet ink for printing on nonporous base materials, which is composed of a volatile cosolvent having a boiling point equal to or lower than 285° C., polymer colloid particles having acidic functional groups, and a pigment-based colorant.

Japanese Unexamined Patent Application Publication No. 2004-195451 (Patent Document 9) proposes an overcoat composition for highly resistant printed images, which contains an aqueous carrier, a humectant, a surfactant, and an additional polymer exhibiting an acid value of higher than 110. In addition, Japanese Unexamined Patent Application Publication No. 2000-44858 (Patent Document 6) mentioned above proposes a printing method including a step of applying an overcoat composition obtained by removing a colorant from an ink composition.

However, non-ion-absorptive and low-ion-absorption recording media have no layers for absorbing ink and developing the color of the ink; thus, they are inferior to inkjet recording media, which are highly absorptive, in terms of color reproduction and have the problem of developing insufficient colors when the inks described above are used. In particular, black letters are difficult to record on both non-ink-absorptive and low-ink-absorption recording media with a sufficient darkness using a single kind of ink.

Incidentally, low viscosities of ink are favorable in rapid printing of high-resolution and high-quality images; however, ink having too low a viscosity has the problem of an insufficient resistance to abrasion because of its low capacity for colorants and resin components. When containing large amounts of colorants and resin components, such a low-viscosity ink hardly ensures sufficient discharge stability.

Meanwhile, Patent Documents 6 and 9 each disclose a method for providing an ink with a high resistance by applying an overcoat composition to printed images. However, these methods have the problem that the relatively small coating thickness of the applied ink leads to an insufficient coating strength.

[Patent Document 1] Japanese Patent No. 3509013

[Patent Document 2] Japanese Unexamined Patent Application Publication No. 2005-120181

[Patent Document 3] Japanese Unexamined Patent Application Publication No. 2005-263967

[Patent Document 4] Japanese Unexamined Patent Application Publication No. 2005-263969

[Patent Document 5] Japanese Unexamined Patent Application Publication No. 2006-316243

[Patent Document 6] Japanese Unexamined Patent Application Publication No. 2000-44858

[Patent Document 7] Japanese Patent No. 3937170

[Patent Document 8] Japanese Unexamined Patent Application Publication No. 2005-220352

[Patent Document 9] Japanese Unexamined Patent Application Publication No. 2004-195451

SUMMARY OF THE INVENTION

Problems to be Solved by the Invention

Therefore, an object of the present invention is to provide a printing method for producing images by inkjet recording on non-ink-absorptive and low-ink-absorption recording media, and the printing method is excellent in terms of image quality, resistance to abrasion, and discharge stability no matter how ink-absorptive recording media used therewith are.

Means for Solving the Problems

The printing method according to the present invention is a printing method for producing images by inkjet recording on non-ink-absorptive and low-ink-absorption recording media, wherein (1) an aqueous ink set includes a chromatic ink and/or an achromatic ink and a resin ink that contains no colorants but contains at least resin particles; (2) the chromatic ink and the achromatic ink each contain at least a water-insoluble colorant, a water-soluble resin component and/or a water-insoluble resin component, a water-soluble penetrating solvent, and a surfactant; (3) the resin ink contains at least thermoplastic resin particles that are insoluble in water but compatible with water-soluble solvents for resins as well as a water-soluble solvent for resins, and the content ratio of the resin particles is equal to or higher than that of the colorants contained in the chromatic ink and the achromatic ink; (4) the content ratio of nonvolatile components contained in the resin ink is equal to or lower than ¼ of that of the resin component contained in the resin ink; (5) the printing resolution per color is equal to or greater than 360 dpi (dots per inch), the ratio of the resolution of an inkjet nozzle to the printing resolution is in the range of 1 to 2, and the ink viscosity is in the range of 1.5 mPa·s to 15 mPa·s (20° C.); and the printing method includes a step of (6) drying performed during and/or after printing.

The present invention is also characterized in that the achromatic ink is black, that the achromatic ink is composed of two or more black inks having different darkness, and that at least one of the black inks is composed of surface-treated carbon black.

The present invention is also characterized in that the chromatic color includes not only process colors but also special colors and that the special colors are orange and green.

The present invention is also characterized in that the chromatic ink, achromatic ink, and resin ink all contain a silicon surfactant and an acetylene glycol surfactant that has an HLB value equal to or less than 6.

The present invention is further characterized in that the chromatic ink, achromatic ink, and resin ink simultaneously contain two or more kinds of glycol-monoether-based water-soluble organic solvents and alkyldiol-based water-soluble organic solvents all of which have an octanol/water partition coefficient of higher than 0.1 as well as a water-soluble polymer that contains a vinyl lactam.

The printing method using an inkjet recording method according to the present invention provides a printing method and a printer for producing images by inkjet recording on non-ink-absorptive and low-ink-absorption recording media, and the printing method and the printer are excellent in terms of image quality, resistance to abrasion, and discharge stability no matter how ink-absorptive recording media used therewith are.

DESCRIPTION OF PREFERRED EMBODIMENTS

The printing method according to the present invention is a printing method wherein (1) an aqueous ink set includes a chromatic ink and/or an achromatic ink and a resin ink that contains no colorants but contains at least resin particles; (2) the chromatic ink and the achromatic ink each contain at least a water-insoluble colorant, a water-soluble resin component and/or a water-insoluble resin component, a water-soluble penetrating solvent, and a surfactant; (3) the resin ink contains at least thermoplastic resin particles that are insoluble in water but compatible with water-soluble solvents for resins as well as a water-soluble solvent for resins, and the content ratio of the resin particles is equal to or higher than that of the colorants contained in the chromatic ink and the achromatic ink; (4) the content ratio of nonvolatile components contained in the resin ink is equal to or lower than ¼ of that of the resin component contained in the resin ink; (5) the printing resolution per color is equal to or greater than 360 dpi (dots per inch), the ratio of the resolution of an inkjet nozzle to the printing resolution is in the range of 1 to 2, and the ink viscosity is in the range of 1.5 mPa·s to 15 mPa·s (20° C.); and the printing method includes a step of (6) drying performed during and/or after printing.

The following describes each individual requirement.

The ink set used in the printing method according to the present invention is an aqueous ink set including a chromatic ink and/or an achromatic ink and a resin ink that contains no colorants but contains at least resin particles. Chromatic inks are inks for producing chromatic colors on recording media, whereas achromatic inks are inks for producing black or gray images on recording media. Also, resin inks are printed before or after printing of the abovementioned chromatic ink and/or achromatic ink and other color inks or simultaneously with the color inks for the main purpose of providing the resultant prints with resistance to abrasion. The method of printing a resin ink before printing color inks can be used to improve the adhesiveness of the color inks in some cases, in particular, in the case the recording medium used therewith is a film made of polyethylene, polypropylene, or some other polyolefin that is non-ink-absorptive and has a low wettability. The method of printing a resin ink simultaneously with color inks or after printing of color inks can be used to increase the ratio of stationary resin to colorants contained in the color inks by the addition of resin to the color inks for an improved resistance to abrasion of printing surfaces.

The chromatic ink and the achromatic ink used in the present invention each contain at least a water-insoluble colorant, a water-soluble resin component and/or a water-insoluble resin component, a water-soluble penetrating solvent, and a surfactant. The water-insoluble colorant is a so-called pigment and is preferably appropriate one selected from organic pigments. Pigments are instable in water as they are, and thus each of the pigments to be added to the inks is preferably dispersed in water using a dispersing resin in advance. Surface-treated pigments, which have hydrophilic surfaces brought about by chemical treatment, may be used instead. When each pigment is dispersed using a dispersing resin, the water-soluble or water-insoluble resin component is added as the dispersing resin; however, when each pigment is a surface-treated pigment, the water-soluble or water-insoluble resin component is added in the form of resin emulsion obtained by dispersing the resin component. Each pigment dispersed using a dispersing resin may further contain a water-soluble resin or resin emulsion as needed.

The water-soluble penetrating solvent and the surfactant are added to the aqueous inks so that non-ink-absorptive and low-ink-absorption recording media, which exhibit a low wettability to water, can be wet by the color inks.

In addition, the chromatic ink and the achromatic ink used in the present invention may further contain a humectant, a preservative, a mold-proofing agent, a pH adjuster, a dissolution aid, an antioxidant, a trapping agent for metals, and so forth as needed.

The resin ink used in the present invention contains at least thermoplastic resin particles that are insoluble in water but compatible with water-soluble solvents for resins and a water-soluble solvent for resins, and the content ratio of the resin particles is equal to or higher than that of the colorants contained in the chromatic ink and the achromatic ink. The thermoplastic resin particles that are insoluble in water but compatible with the water-soluble solvents for resins described later are insoluble in water but compatible with a solvent for resins contained together therewith in the resin ink, and they are dispersed in water in a stable manner, taking the form of resin emulsion. The term "compatible" means that the combination of the solvent for resins and the resin particles results in dissolution or swelling of the particles. When compatibility is ensured, the resin ink leaves a strong resin film after it is dried even if the drying temperature is lower than the original glass transition temperature of the resin particles.

Additionally, the content ratio of the resin particles is preferably equal to or higher than that of the colorants contained in the chromatic ink and the achromatic ink. For example, when the ink set includes a black ink containing a pigment at 5 wt % (weight %) as a color ink in addition to a resin ink, it is particularly preferable that the resin ink contains resin at a content ratio of at least 5 wt %.

Furthermore, each color ink preferably contains a dispersing resin or resin emulsion no matter what the resin ink is. For example, an ink set in which the total content ratio of resin is 6 wt % with the breakdown of 1 wt % in a color ink and 5 wt % in a resin ink is better in terms of resistance to abrasion than one formulated as the combination of a color ink containing a surface-treated pigment at 5 wt % and a resin ink with the resin ink solely responsible for the same total content ratio of resin, 6 wt %.

The content ratio of nonvolatile components contained in the resin ink used in the present invention is preferably equal to or lower than ¼ of that of the resin component contained in the resin ink. Examples of the nonvolatile components include inorganic salts acting as a trapping agent for metals or the like, such as sodium hydroxide, potassium hydroxide, and salts of EDTA, and surfactants having a boiling point equal to or higher than 300° C. These nonvolatile components remain in the coatings of ink because of their high boiling points but have no adverse effects on adhesiveness as long as their content ratio is equal to or lower than ¼ of that of the resin component.

In the present invention, the printing resolution per color is equal to or greater than 360 dpi (dots per inch), the ratio of the resolution of an inkjet nozzle to the printing resolution is in the range of 1 to 2, and the ink viscosity is in the range of 1.5 mPa·s to 15 mPa·s (20° C.). The printing resolution as high as 360 dpi or more is desirable for a high image quality, the ratio of the resolution of an inkjet nozzle to the printing resolution falling within the range of 1 to 2 allows for rapid printing, and the ink viscosity is preferably in the range of 1.5 mPa·s to 15 mPa·s (20° C.) for stable ink supply from an ink tank to a head. For example, when the nozzle resolution is 360 dpi and the printing resolution is in the range of 360 dpi to 720 dpi, the above-described requirements are favorable. In addition, any printing speed at which the ratio of resolution exceeds 2 would cause no problems in the use of the ink according to the present invention.

Recording media used in the printing method according to the present invention are preferably non-ink-absorptive and low-ink-absorption recording media. Examples of the non-ink-absorptive recording media include plastic films receiving no surface treatment for inkjet printing (i.e., films having no ink absorption layers) and materials obtained by coating base materials, such as paper, with plastics or by attaching plastic films to base materials. Examples of the plastics include polyvinyl chloride, polyethylene terephthalate, polycarbonate, polystyrene, polyurethane, polyethylene, and polypropylene. Examples of the low-ink-absorption recording media include printing paper such as art paper, coated paper, and matt paper.

Note that the non-ink-absorptive and low-ink-absorption recording media are ones whose printing surface shows the following result when tested by Bristow method: the amount of water absorbed for the period from the first contact to 30 msec is equal to or less than 10 mL/$m^2$. This Bristow method is the most commonly used method for measuring liquid absorptions for a short period of time and has been approved by Japan Technical Association of the Pulp and Paper Industry (JAPAN TAPPI). The test method is detailed in JAPAN TAPPI Kami Parupu Shiken Hoho 2000 (JAPAN TAPPI Test Methods 2000) as Specification No. 51, "Paper and Cardboards-Liquid Absorption Test Methods-Bristow Method."

The printing method according to the present invention preferably includes a drying step that is performed during and/or after printing. Preferred examples of the drying step include forced-air heating, radiation heating, conduction heating, high-frequency drying, and microwaves for drying. This additional drying step provides dried prints with a sufficient resistance to abrasion. Note that the glass transition temperatures of the resin emulsion contained in the color inks and the resin contained in the resin ink are preferably equal to or higher than room temperature, more specifically, equal to or higher than approximately 30° C. When these resins are composed solely of components each having a glass transition temperature of lower than room temperature, the components of the resins can admittedly adhere to recording media without a post-printing drying step; however, the resultant ink has an insufficient resistance to abrasion and often causes clogging of a head nozzle by forming adhesive solid matter when the moisture content thereof is dried at the end of the nozzle.

The ink set used in the printing method according to the present invention preferably meets the following: the achromatic ink is black; the achromatic ink is composed of two or more black inks having different darkness; and at least one of the black inks is composed of surface-treated carbon black. As described above, non-ion-absorption and low-ion-absorption recording media have no layers for absorbing ink and developing the color of the ink; thus, they are inferior to inkjet recording media, which are highly absorptive, in terms of color reproduction, and black letters are especially difficult to record on both non-ink-absorptive and low-ink-absorption recording media with a sufficient darkness using a single kind of ink. Since one of the black inks is a surface-treated one so that the concentration of pigments can be improved, the ink can be printed with an intense darkness on recording media that are relatively absorptive. Since the other one of the black inks is one dispersed by resin, the ink can be printed with an intense darkness also on non-absorptive recording media as uniform and glossy coatings. This ink set, which contains two kinds of achromatic inks, allows for performing printing with an intense darkness on a broad spectrum of recording media ranging from non-absorptive to low-absorption ones.

The ink set used in the printing method according to the present invention preferably includes not only process colors, namely, yellow, magenta, and cyan, but also special colors. More preferably, the special colors are orange and green. Non-ion-absorption and low-ion-absorption recording media have no layers for absorbing ink and developing the color of the ink; thus, they are inferior to inkjet recording media, which are highly absorptive, in terms of color reproduction. However, the addition of special colors to the process colors results in better color reproduction even when the absorption is low. Examples of the special colors may include red, green, blue, orange, and violet; however, particularly preferred ones of them are orange and green.

The ink used in the printing method according to the present invention preferably meets the following: the chromatic ink, achromatic ink, and resin ink all contain a silicon surfactant and an acetylene glycol surfactant that has an HLB value equal to or less than 6. The combined use of the silicon surfactant and the acetylene glycol surfactant can produce an ink that can uniformly wet a broad spectrum of recording media ranging from non-absorptive to low-absorption ones, thereby resulting in prints having no unevenness by repelled ink.

The ink used in the printing method according to the present invention is highly compatible with plastic materials because of its hydrophobic wettability and polarity-based affinity and improves the resistance to abrasion of resultant prints on the use with a wide variety of recording media by further meeting the following: the chromatic ink, achromatic ink, and resin ink simultaneously contain two or more kinds of glycol-monoether-based water-soluble organic solvents and alkyldiol-based water-soluble organic solvents all of which have an octanol/water partition coefficient of higher than 0.1 as well as a water-soluble polymer that contains a vinyl lactam.

The following describes each individual material of the ink.

Each of the colorants contained in the chromatic ink and the achromatic ink, namely, each water-insoluble colorant, is a so-called pigment and is preferably appropriate one selected from organic pigments.

Specific examples of carbon black used in the present invention as a preferred colorant for the achromatic black ink include No. 2300, 900, MCF88, No. 20B, No. 33, No. 40, No. 45, No. 52, MA7, MA8, MA100, and No. 2200B (trade names; manufactured by Mitsubishi Chemical Corporation); Color Black FW1, FW2, FW2V, FW18, FW200, S150, S160, and S170, Printex 35, U, V, and 140U, Special Black 6, 5, 4A, 4, and 250 (trade names; manufactured by Degussa); Conductex SC and Raven 1255, 5750, 5250, 5000, 3500, 1255, and 700 (trade names; manufactured by Columbia Carbon); and Regal 400R, 330R, and 660R, Mogul L, and Monarch 700, 800, 880, 900, 1000, 1100, 1300, and 1400, and Elftex 12 (trade names; manufactured by Cabot Corporation). Note that these are just examples of carbon black suitably used in the present invention and never limit the present invention. These carbon black products may be used individually or in combination of two or more kinds. The content ratio of these pigments to the whole amount of the pigment dispersion liquid is in the range of 0.5 wt % to 12 wt % and preferably in the range of 2 wt % to 8 wt %.

Examples of organic pigments for the chromatic ink suitably used in the present invention include quinacridone pigments, quinacridone quinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments.

Specific examples of organic pigments for the pigment dispersion liquid used in the present invention include the following.

Examples of the pigment used in a cyan-pigment dispersion liquid include C.I. Pigment Blue 1, 2, 3, 15:3, 15:4, 15:34, 16, 22, and 60, and C.I. Bat Blue 4 and 60. The pigment is preferably one selected from the group consisting of C.I. Pigment Blue 15:3, 15:4, and 60 or a mixture of two or more kinds selected from this group.

Examples of the pigment used in a magenta-pigment dispersion liquid include C.I. Pigment Red 5, 7, 12, 48 (Ca), 48 (Mn), 57 (Ca), 57:1, 112, 122, 123, 168, 184, and 202 and C.I. Pigment Violet 19. The pigment is preferably one selected from the group consisting of C.I. Pigment Red 122, 202, and 209 and C.I. Pigment Violet 19 or a mixture of two or more kinds selected from this group.

Examples of the pigment used in a yellow-pigment dispersion liquid include C.I. Pigment Yellow 1, 2, 3, 12, 13, 14C, 16, 17, 73, 74, 75, 83, 93, 95, 97, 98, 109, 110, 114, 128, 129, 138, 150, 151, 154, 155, 180, and 185. The pigment is preferably one selected from the group consisting of C.I. Pigment Yellow 74, 109, 110, 128, and 138 or a mixture of two or more kinds selected from this group.

The pigment used in an orange-pigment dispersion liquid is C.I. Pigment Orange 36 or 43 or a mixture of them.

The pigment used in a green-pigment dispersion liquid is C.I. Pigment Green 7 or 36 or a mixture of them.

These pigments may be dispersed using dispersing resin or used as self-dispersing pigments after their surfaces are oxidized or sulfonated by ozone, hypochlorous acid, fuming sulfuric acid, or the like.

The content ratio of these pigments to the individual color dispersion liquids is on the order of 0.5 wt % to 15 wt % and preferably on the order of 2 wt % to 10 wt %.

The dispersing resin and the resin emulsion used in the present invention are preferably as follows.

These resins are water-insoluble but should be dispersible in water; thus, they are preferably polymers having both hydrophilic and hydrophobic moieties. When resin emulsion is used as thermoplastic resin, no particular limitation is posed on the size of particles contained therein as long as the size allows for the formation of emulsion. The particle size is preferably equal to or smaller than approximately 150 nm and more preferably on the order of 5 nm to 100 nm.

The thermoplastic resin may be a dispersant resin commonly used in ink compositions for inkjet recording or a resin component similar to the resin emulsion. Specific examples of the thermoplastic resin include acrylic polymers, such as polyacrylic acid esters and their copolymers, polymethacrylic acid esters and their copolymers, polyacrylonitrile and their copolymers, polycyanoacrylate, polyacrylamide, polyacrylic acid, and polymethacrylic acid; polyolefins, such as polyethylene, polypropylene, polybutene, polyisobutylene, polystyrene, and their copolymers, petroleum resins, coumarone-indene resins, and terpene resins; vinyl acetate-vinyl alcohol polymers, such as polyvinyl acetate and their copolymers, polyvinyl alcohols, polyvinyl acetals, and polyvinyl ethers; halogen-containing polymers, such as polyvinyl chloride and their copolymers, polyvinylidene chloride, fluororesins, and fluororubbers; nitrogen-containing vinyl polymers, such as polyvinyl carbazole, polyvinyl pyrrolidone and their copolymers, polyvinyl pyridine, and polyvinyl imidazole; diene polymers, such as polybutadiene and their copolymers, polychloroprene, and polyisoprene (butyl rubber); and other resins obtained by ring-opening polymerization or condensation polymerization and natural polymeric resins.

Examples of the thermoplastic resin further include Hytec E-7025P, Hytec E-2213, Hytec E-9460, Hytec E-9015, Hytec E-4A, Hytec E-5403P, and Hytec E-8237 (trade names; manufactured by TOHO Chemical Co., Ltd.) and AQUACER 507, AQUACER 515, and AQUACER 840 (trade names; manufactured by BYK Japan KK).

When the thermoplastic resin is obtained in the state of emulsion, it can be prepared by mixing resin particles with water and, if necessary, a surfactant. For example, emulsion of an acrylic resin or a styrene-acrylic acid copolymer resin can be obtained by mixing a (meth)acrylic acid ester resin or a styrene-(meth)acrylic acid ester resin with water and, if necessary, a (meth)acrylic acid resin and a surfactant. A preferred mixing ratio of the resin component to the surfactant is usually on the order of 50:1 to 5:1. When the amount of the surfactant is too small to satisfy this range, emulsion is hardly formed; however, when the amount of the surfactant is too large to satisfy this range, the resultant ink often has a problematically low resistance to water or is poor in terms of adhesiveness.

No particular limitation is posed on the kind of surfactant used here. Preferred examples of the surfactant include anionic surfactants (e.g., sodium dodecylbenzenesulfonate, sodium laurrate, and ammonium salts of polyoxyethylene alkyl ether sulfate) and nonionic surfactants (e.g., polyoxyethylene alkyl ethers, polyoxyethylene alkyl esters, polyoxyethylene sorbitan fatty acid esters, polyoxyethylene alkyl phenyl ethers, polyoxyethylene alkyl amines, and polyoxyethylene alkyl amides). These surfactants may be used in combination of two or more kinds.

The emulsion of thermoplastic resin can be obtained also by performing emulsion polymerization of a monomer of any of the resin components listed earlier in water containing a polymerization catalyst and an emulsifier. The polymerization initiator, emulsifier, and molecular weight modifier used in this emulsion polymerization process may be ones used in ordinary methods.

The polymerization initiator is one commonly used in ordinary radical polymerization, and examples thereof include potassium persulfate, ammonium persulfate, hydrogen peroxide, azobisisobutyronitrile, benzoyl peroxide, dibutyl peroxide, peracetic acid, cumene hydroperoxide, t-butyl hydroxy peroxide, and paramenthane hydroxy peroxide. When the polymerization reactions are conducted in water, water-soluble polymerization initiators are preferable. Examples of the emulsifier include sodium lauryl sulfate, commonly used anionic surfactants, nonionic surfactants, and amphoteric surfactants, and mixtures of these surfactants. They may be used in combination of two or more kinds.

An appropriate content ratio of the resin and water as components of the disperse phase is as follows: the content ratio of water to 100 parts by weight of the resin is preferably in the range of 60 parts by weight to 400 parts by weight and more preferably in the range of 100 parts by weight to 200 parts by weight.

The resin emulsion used as the thermoplastic resin may be known one. For example, resin emulsion selected from those described in the following publications can be used as it is: Japanese Examined Patent Application Publication No. S62-1426, Japanese Unexamined Patent Application Publication No. H3-56573, Japanese Unexamined Patent Application Publication No. H3-79678, Japanese Unexamined Patent Application Publication No. H3-160068, and Japanese Unexamined Patent Application Publication No. H4-18462. Commercially available resin emulsion products are also applicable, and examples thereof include Microgel E-1002 and E-5002 (styrene-acrylic resin emulsion products; manufactured by Nippon Paint Co., Ltd.), Voncoat 4001 (an acrylic resin emulsion product; manufactured by Dainippon Ink and Chemicals, Inc.), Voncoat 5454 (a styrene-acrylic resin emulsion product; manufactured by Dainippon Ink and Chemicals, Inc.), SAE 1014 (a styrene-acrylic resin emulsion product; manufactured by ZEON Corporation), and Saivinol SK-200 (an acrylic acid emulsion product; manufactured by Saiden Chemical Industry Co., Ltd.).

In the present invention, the thermoplastic resin to be mixed with other components of the aqueous ink may take the form of particulate powder; however, it is preferably prepared to take the form of resin emulsion in advance.

From the viewpoints of the long-term storage stability and discharge stability of the resultant aqueous inks, the size of resin particles used in the present invention is preferably in the range of 5 nm to 400 nm and more preferably in the range of 50 nm to 200 nm.

The content ratio of the thermoplastic resin to the whole amount of the aqueous ink is preferably in the range of 0.1 wt % to 15.0 wt % and more preferably in the range of 0.5 wt % to 10.0 wt % on the basis of solid content. Too low a content ratio of resin components in the aqueous ink would cause thin ink coatings to be formed on surfaces of plastics, thereby resulting in insufficient adhesiveness of the inks to the surfaces of plastics. However, too high a content ratio of the resin components would cause insufficient dispersion of the resin to occur in stored ink compositions or to aggregate and solidify even after a slight amount of water evaporates, thereby inhibiting the formation of uniform coatings.

The water-soluble penetrating solvent and the surfactant for the aqueous inks used in the present invention are preferably as follows.

Examples of the water-soluble penetrating solvent include monovalent alcohols as well as polyvalent alcohols and derivatives.

Especially suitable monovalent alcohols are ones having one to four carbon atoms, such as methanol, ethanol, n-propanol, isopropanol, and n-butanol.

Applicable polyvalent alcohols and their derivatives are divalent to pentavalent alcohols having two to six carbon atoms and their ethers completely or partially etherified with lower alcohols having one to four carbon atoms. The derivatives of polyvalent alcohols mentioned herein are ones having at least one etherified hydroxyl group and thus exclude polyvalent alcohols having no etherified hydroxyl groups.

Specific examples of such polyvalent alcohols and their lower alkyl ethers include diols such as 1,2-hexanediol, 1,3-hexanediol, 1,2-heptanediol, 1,3-heptanediol, 1,2-octanediol, 1,3-octanediol, and 1,2-pentanediol, mono/di/triethylene glycol-mono/dialkyl ethers, and mono/di/tripropylene glycol-mono/dialkyl ethers. Preferred ones of them are triethylene glycol monobutyl ether, diethylene glycol monobutyl ether, diethylene glycol monopropyl ether, diethylene glycol monopentyl ether, propylene glycol monobutyl ether, and so forth.

The content ratio of the water-soluble penetrating solvent to the whole amount of the ink composition is, for example, in the range of 0.5 wt- to 15.0 wt % and preferably in the range of 1.0 wt % to 8.0 wt %.

The surfactant is preferably a silicon surfactant or an acetylene glycol surfactant.

The silicon surfactant is preferably a polysiloxane compound or the like, for example, polyether-denatured organosiloxane. Preferred applicable examples include BYK Japan's silicon-based additives BYK-306, BYK-307, BYK-333, BYK-341, BYK-345, BYK-346, and BYK-348.

Preferred examples of the acetylene glycol surfactant include Surfynol 104E, 104H, 104A, 104BC, 104DPM, 104PA, 104PG-50, 104S, 420, SE, SE-F, 61, 82, and DF-110D (trade names; manufactured by Nissin Chemical Industry Co., Ltd.) and Acetylenol E00 and E00P (trade names; manufactured by Kawaken Fine Chemicals Co., Ltd.).

A particularly preferred example of the surfactant is a combination simultaneously containing a silicon surfactant and an acetylene glycol surfactant that has an HLB value equal to or less than 6. Although the content ratio of this surfactant is preferably in the range of 1 wt % or lower, it may be appropriately adjusted depending on the kind of recording medium or ink.

With the combined use of the above-described water-soluble penetrating solvent and surfactant, the surface tension of the resultant aqueous inks is preferably controlled to fall within the range of 23.0 mN/m to 40.0 mN/m and more preferably within the range of 25.0 mN/m to 35.0 mN/m.

The water-soluble solvent for resins suitably used with the resin ink contained in the present invention is selected from water-soluble solvents that are compatible with the resin emulsion contained together therewith in the resin ink. Each kind of resin has an ideal solvent as its counterpart; however, specific preferred examples of the solvent can be listed as follows: pyrrolidones such as N-methylpyrrolidone, N-ethylpyrrolidone, N-vinylpyrrolidone, and 2-pyrrolidone, dimethyl sulfoxide, ε-caprolactam, methyl lactate, ethyl lactate, isopropyl lactate, butyl lactate, ethylene glycol monomethyl ether, ethylene glycol dimethyl ether, ethylene glycol monomethyl ether acetate, diethylene glycol monomethyl ether, diethylene glycol dimethyl ether, diethylene glycol ethyl methyl ether, diethylene glycol diethyl ether, diethylene glycol isopropyl ether, propylene glycol monomethyl ether, propylene glycol dimethyl ether, dipropylene glycol monomethyl ether, dipropylene glycol dimethyl ether, 1,4-dioxane, and so forth. Pyrrolidones are particularly preferable because of their sufficient drying rate and performance in promoting the formation of coatings.

The water-soluble solvent for resins is usually added to the resin ink; however, when added to the chromatic ink and/or the achromatic ink, it works more like an effective reinforcement of resulting coatings instead of a cause of problems.

The content ratio of the water-soluble solvent for resins to the whole amount of the ink composition is preferably in the range of 1.0 wt % to 20.0 wt % and more preferably in the range of 2.0 wt % to 15.0 wt %.

In addition, the water-soluble solvents described above, in particular, the water-soluble penetrating solvent, renders the resultant inks an ability to produce prints excellent in terms of adhesiveness when combined and formulated in such a manner that the octanol/water partition coefficient (hereinafter, simply referred to as log Pow) will be a predetermined value. For example, the ink may simultaneously contain a combination of a glycol-monoether-based water-soluble organic solvent represented by aforementioned ones, namely, diethylene glycol monobutyl ether (log Pow: 0.56), propylene glycol monobutyl ether (log Pow: 1.15), dipropylene glycol monopropyl ether (log Pow: 0.87), diethylene glycol monohexyl ether (log Pow: 1.7), ethylene glycol-2-ethyl hexyl ether (log Pow: 2.46), diethylene glycol-2-ethyl hexyl ether (log Pow: 2.38) and so forth, and an alkyldiol-based water-soluble organic solvent represented by aforementioned ones, namely, 1,2-hexanediol (log Pow: 0.25), 1,2-heptanediol (log Pow: 0.78), 2,3-heptanediol (log Pow: 0.6), 1,3-heptanediol (log Pow: 0.9), and so forth.

The content ratios of the glycol-monoether-based water-soluble organic solvent and the alkyldiol-based water-soluble organic solvent both of which have an octanol/water partition coefficient of higher than 0.1 are preferably in the range of 0.5 wt % to 10.0 wt % and more preferably in the range of 1 wt % to 5.0 wt % relative to the whole amount of the ink composition.

Preferably, these solvents are contained together with a water-soluble polymer that contains a vinyl lactam. Examples of the water-soluble polymer that contains a vinyl lactam include polyvinyl pyrrolidone, polyvinyl caprolactam, and water-soluble copolymers containing monomers of them such as vinyl acetate-vinyl pyrrolidone copolymers, vinyl pyrrolidone-methacrylamide copolymers, and vinyl caprolactam-methacrylamide copolymers. The content ratio of these water-soluble polymers to the whole amount of the aqueous inks is preferably in the range of 0.05 wt % to 5 wt % and more preferably in the range of 0.1 wt % to 2.5 wt % on the basis of solid content.

Water is the main medium of the aqueous inks used in the present invention and preferably contains little or no ionic impurities; thus, preferred forms of water include water purified by ion exchange, ultrafiltration, reverse osmosis, distillation, or the like and ultrapure water. In addition, water sterilized by ultraviolet irradiation or the addition of hydrogen peroxide is favorable because it prevents fungi and bacteria from occurring in pigment disperse liquids and their resultant aqueous inks during the long-term storage of them.

In addition to the components described above, the following additives may be contained as needed: a humectant, a preservative, a mold-proofing agent, a pH adjuster, a dissolution aid, an antioxidant, a trapping agent for metals, and so forth.

Preferably, the humectant leaves no residual matter in coatings when the coatings are dried. Applicable examples include ethylene glycol, diethylene glycol, propylene glycol, dipropylene glycol, 1,3-propanediol, 1,4-butanediol, hexylene glycol, and 2,3-butanediol.

Examples of the preservative and the mold-proofing agent include sodium benzoate, sodium pentachlorophenol, sodium 2-pyridinethiol-1-oxide, sodium sorbate, sodium dehydroacetate, and 1,2-dibenzisothiazoline-3-one (ICI's Proxel CRL, Proxel BDN, Proxel GXL, Proxel XL-2, and Proxel TN).

Examples of the pH adjuster include inorganic alkali compounds such as sodium hydroxide and potassium hydroxide, ammonia, diethanolamine, triethanolamine, triisopropanolamine, morpholine, potassium dihydrogenphosphate, and disodium hydrogenphosphate.

Examples of the dissolution aid include urea, thiourea, dimethylurea, tetraethylurea, allophanates such as allophanate and methyl allophanate, and biurets such as biuret, dimethyl biuret, and tetramethyl biuret.

Examples of the trapping agent for metals include disodium ethylenediaminetetraacetate.

EXAMPLES

Embodiments of the present invention are described with reference to the following examples. Note that these examples should not be regarded as limitations on the present invention; they simply appropriately explain methods for manufacturing some compositions according to the present invention that are best-known on the basis of currently available experimental data. Thus, representative compositions and methods for manufacturing them are specified in this specification.

[Preparation of Ink]

(Preparation of Chromatic Ink Composition 1)

A cyan ink was prepared to contain the following components (all content ratios are in weight %; this applies also in the subsequent examples): a colorant: C.I. Pigment Blue 15:3 at 4%; a dispersant resin for the colorant: an acrylic acid-acrylic acid ester copolymer (molecular weight: 25,000; glass transition temperature: 80° C.; acid value: 180) at 2%; resin emulsion: a styrene-acrylic acid copolymer (molecular weight: 50,000; acid value: 130; average particle size: 75 nm) at 2%; a water-soluble penetrating solvent: 1,2-hexanediol at 5%; surfactants: BYK-348 (a trade name; polyether-denatured organosiloxane manufactured by BYK Japan KK) at 0.6% and Surfynol DF-110D (a trade name; manufactured by Nissin Chemical Industry Co., Ltd.) at 0.2%; a water-soluble solvent for resins: 2-pyrrolidone at 5%; a humectant: propylene glycol at 10%; and purified water as the balance.

(Preparation of Chromatic Ink Compositions 2 to 5)

Magenta, yellow, orange, and green inks were prepared in accordance with the formulation of Chromatic Ink 1, except that the following colorants were used instead: Composition 2: C.I. Pigment Red 122; Composition 3: C.I. Pigment Yellow 180; Composition 4: C.I. Pigment Orange 43; and Composition 5: C.I. Pigment Green 36.

(Preparation of Achromatic Ink Composition 6)

A black ink was prepared to contain the following components: a colorant: MA77 (a trade name; manufactured by Mitsubishi Chemical Corporation), carbon black, at 4%; a dispersant resin for the colorant: an acrylic acid-acrylic acid ester copolymer (molecular weight: 25,000; glass transition temperature: 80° C.; acid value: 180) at 2%; resin emulsion: a styrene-acrylic acid copolymer (molecular weight: 50,000; acid value: 130; average particle size: 75 nm) at 2%; a water-soluble penetrating solvent: 1,2-hexanediol at 5%; surfactants: BYK-348 (a trade name; polyether-denatured organosiloxane manufactured by BYK Japan KK) at 0.4% and Surfynol DF-110D (a trade name; manufactured by Nissin Chemical Industry Co., Ltd.) at 0.2%; a water-soluble solvent for resins: 2-pyrrolidone at 5%; a humectant: propylene glycol at 10%; and purified water as the balance.

(Preparation of Achromatic Ink Composition 7)

Surface-treated carbon black was made by dispersing Color Black S170 (a trade name; manufactured by Deggusa-Huls AG), carbon black as a colorant, while oxidizing the surfaces of the colorant using sodium hypochlorite.

A surface-treated black ink was prepared to contain the following components: the surface-treated carbon black described above at 4%; resin emulsion: a styrene-acrylic acid copolymer (molecular weight: 50,000; acid value: 130; average particle size: 75 nm) at 4%; a water-soluble penetrating solvent: 1,2-hexanediol at 5%; a surfactant: Surfynol 104PG-50 (a trade name; manufactured by Nissin Chemical Industry Co., Ltd.) at 0.5%; a water-soluble solvent for resins: 2-pyrrolidone at 5%; a humectant: propylene glycol at 10%; and purified water as the balance.

(Preparation of Resin Ink Composition 8)

A resin ink was prepared to contain the following components: resin emulsion: a styrene-acrylic acid copolymer (molecular weight: 50,000; acid value: 130; average particle size: 75 nm) at 6% and AQUACER 515 at 2%; a water-soluble penetrating solvent: 1,2-hexanediol at 5%; surfactants: BYK-348 (a trade name; polyether-denatured organosiloxane manufactured by BYK Japan KK) at 0.6% and Surfynol DF-110D (a trade name; manufactured by Nissin Chemical Industry Co., Ltd.) at 0.2%; water-soluble solvents for resins: 2-pyrrolidone at 51 and hexylene glycol at 5%; a humectant: propylene glycol at 3%; and purified water as the balance.

(Preparation of Chromatic Ink Composition B1)

A cyan ink was prepared to contain the following components: a colorant: C.I. Pigment Blue 15:3 at 4%; a dispersant resin for the colorant: an acrylic acid-acrylic acid ester copolymer (molecular weight: 25,000; glass transition temperature: 80° C.; acid value: 180) at 2%; resin emulsion: styrene-acrylic acid copolymer (molecular weight: 50,000; acid value: 130; average particle size: 75 nm) at 2%; an alkyldiol-based water-soluble penetrating solvent having an octanol/water partition coefficient of higher than 0.1: 1,2-hexanediol (log Pow: 0.25) at 3%; a glycol-monoether-based water-soluble organic solvent: diethylene glycol-2-ethyl hexyl ether (log Pow: 2.38) at 1%; a water-soluble polymer containing a vinyl lactam: polyvinyl pyrrolidone (K-15) at 0.3%; surfactants: BYK-348 (a trade name; polyether-denatured organosiloxane manufactured by BYK Japan KK) at 0.4% and Surfynol DF-110D (a trade name; manufactured by Nissin Chemical Industry Co., Ltd.) at 0.1%; a water-soluble solvent for resins: 2-pyrrolidone at 5%; a humectant: propylene glycol at 8%; and purified water as the balance.

(Preparation of Chromatic Ink Compositions B2 to B5)

Magenta, yellow, orange, and green inks were prepared in accordance with the formulation of Chromatic Ink B1, except that the following colorants were used instead: Composition B2: C.I. Pigment Red 122; Composition B3: C.I. Pigment Yellow 180; Composition B4: C.I. Pigment Orange 43; and Composition B5: C.I. Pigment Green 36.

(Preparation of Achromatic Ink Composition B6)

A black ink was prepared to contain the following components: a colorant: MA77 (a trade name; manufactured by Mitsubishi Chemical Corporation), carbon black, at 4%; a dispersant resin for the colorant: an acrylic acid-acrylic acid ester copolymer (molecular weight: 25,000; glass transition temperature: 80° C.; acid value: 180) at 2%; resin emulsion: a styrene-acrylic acid copolymer (molecular weight: 50,000; acid value: 130; average particle size: 75 nm) at 2%; an alkyldiol-based water-soluble penetrating solvent having an octanol/water partition coefficient of higher than 0.1: 1,2-hexanediol (log Pow: 0.25) at 2%; a glycol-monoether-based water-soluble organic solvent: diethylene glycol-2-ethyl hexyl ether (log Pow: 2.38) at 2%; a water-soluble polymer containing a vinyl lactam: polyvinyl pyrrolidone (K-15) at 0.2%; surfactants: BYK-348 (a trade name; polyether-denatured organosiloxane manufactured by BYK Japan KK) at 0.4% and Surfynol DF-110D (a trade name; manufactured by Nissin Chemical Industry Co., Ltd.) at 0.1%; a water-soluble solvent for resins: 2-pyrrolidone at 5%; a humectant: propylene glycol at 8%; and purified water as the balance.

(Preparation of Achromatic Ink Composition B7)

A surface-treated black ink was prepared to contain the following components: the surface-treated carbon black used in Composition 7 at 4%; resin emulsion: a styrene-acrylic acid copolymer (molecular weight: 50,000; acid value: 130; average particle size: 75 nm) at 4%; an alkyldiol-based water-soluble penetrating solvent having an octanol/water partition coefficient of higher than 0.1: 1,2-hexanediol (log Pow: 0.25) at 2%; a glycol-monoether-based water-soluble organic solvent: diethylene glycol-2-ethyl hexyl ether (log Pow: 2.38) at 2%; a water-soluble polymer containing a vinyl lactam: polyvinyl pyrrolidone (K-15) at 0.15%; a surfactant: Surfynol 104PG-50 (a trade name; manufactured by Nissin Chemical Industry Co., Ltd.) at 0.5%; a water-soluble solvent for resins: 2-pyrrolidone at 5%; a humectant: propylene glycol at 10%; and purified water as the balance.

(Preparation of Resin Ink Composition B8)

A resin ink was prepared to contain the following components: resin emulsion: a styrene-acrylic acid copolymer (molecular weight: 50,000; acid value: 130; average particle size: 75 nm) at 6% and AQUACER 515 at 2%; an alkyldiol-based water-soluble penetrating solvent having an octanol/water partition coefficient of higher than 0.1: 1,2-hexanediol (log Pow: 0.25) at 3%; a glycol-monoether-based water-soluble organic solvent: diethylene glycol-2-ethyl hexyl ether (log Pow: 2.38) at 1%; a water-soluble polymer containing a vinyl lactam: polyvinyl pyrrolidone (K-15) at 0.15%; surfactants: BYK-348 (a trade name; polyether-denatured organosiloxane manufactured by BYK Japan KK) at 0.4% and Surfynol DF-110D (a trade name; manufactured by Nissin Chemical Industry Co., Ltd.) at 0.1%; a water-soluble solvent for resins: 2-pyrrolidone at 5%; a humectant: propylene glycol at 6%; and purified water as the balance.

[Printing]

An ink set including Compositions 1 to 8 and an eight-color ink set including Compositions B1 to B8 were loaded onto an inkjet printer PX-930 (a trade name; manufactured by Seiko Epson Corporation; nozzle resolution: 180 dpi) that had a heater attached to its paper guide and was preheated to 40° C., and printing was performed at a resolution of 360 dpi on the following recoding media: a non-absorptive recording medium whose recording surface is a plastic film: a PET-based cold laminate film PG-50L (a trade name; manufactured by LAMI Corporation Inc.); and a low-absorption recording medium: OK Topcoat+ (a trade name; manufactured by Oji paper Co., Ltd.), a glossy fine-coated paper used as so-called printing paper. Immediately after produced, prints were dried for 1 minute in a drying oven at 60° C. The produced images were favorable in terms of quality and resistance to abrasion.

Comparative Example

[Preparation of Inks]

(Preparation of Chromatic Ink Composition 9)

A cyan ink was prepared to contain the following components: a colorant: C.I. Pigment Blue 15:3 at 4%; a dispersant resin for the colorant: an acrylic acid-acrylic acid ester copolymer (molecular weight: 25,000; glass transition temperature: 80° C.; acid value: 180) at 4%; resin emulsion: a styrene-acrylic acid copolymer (molecular weight: 50,000; acid value: 130; average particle size: 75 nm) at 2%; a water-soluble penetrating solvent: 1,2-hexanediol at 5%; surfactants: BYK-348 (a trade name; polyether-denatured organosiloxane manufactured by BYK Japan KK) at 0.6% and Surfynol DF-110D (a trade name; manufactured by Nissin Chemical Industry Co., Ltd.) at 0.2%; a water-soluble solvent for resins: 2-pyrrolidone at 5%; a humectant: propylene glycol at 5%; and purified water as the balance.

(Preparation of Chromatic Ink Compositions 2 to 4)

Inks were prepared in accordance with the formulation of Chromatic Ink 1, except that the following colorants were used instead: Composition 2: C.I. Pigment Red 122; Composition 3: C.I. Pigment Yellow 180; and Composition 4: MA77 (a trade name; manufactured by Mitsubishi Chemical Corporation), carbon black.

[Printing]

A printing test was performed in the same manner as that for the inks according to the present invention, except that the obtained inks having four different colors, namely, Composition 9 and Compositions 2 to 4, were loaded onto the inkjet printer PX-930 together with the remaining four color slots filled with an orange ink, a green ink, an achromatic ink containing surface-treated carbon black, and water as a replacement for the resin ink. Immediately after produced, prints were dried for 1 minute in a drying oven at 60° C. When compared to those obtained using the ink sets according to the present invention, the produced images were inferior in terms of quality; more specifically, darkness was weak on the glossy fine-coated paper OK Topcoat+, and the color gamut volume was small. Resistance to abrasion was lower in all of the tested inks than in those constituting the ink sets according to the present invention.

[Industrial Applicability]

The present invention has industrial applicability in its relevant applications, namely, a printing method using an inkjet recording method for printing on non-ink-absorptive and low-ink-absorption recording media and a printing method using an inkjet recording method that is excellent in terms of image quality, resistance to abrasion, and discharge stability no matter how ink-absorptive recording media used therewith are.

What is claimed is:

1. A printing method for producing images comprising printing with an aqueous ink set by inkjet recording on a non-ink-absorptive or low-ink-absorptive recording surface of a recording medium wherein (1) the aqueous ink set includes a chromatic ink and/or an achromatic ink and a resin ink that contains no colorants but contains at least resin particles;

(2) the chromatic ink and the achromatic ink each contain at least a water-insoluble colorant, a water-soluble resin component and/or a water-insoluble resin component, a water-soluble penetrating solvent, and a surfactant;

(3) the resin ink contains at least thermoplastic resin particles that are insoluble in water but compatible with water-soluble solvents for resins as well as a water-soluble solvent for resins, and the content ratio of the resin particles is equal to or higher than that of the colorants contained in the chromatic ink and the achromatic ink;

(4) the content ratio of nonvolatile components contained in the resin ink is equal to or lower than ¼ of that of the resin component contained in the resin ink;

(5) the printing resolution per color is equal to or greater than 360 dpi (dots per inch), the ratio of the resolution of an inkjet nozzle to the printing resolution is in the range of 1 to 2, and the ink viscosity is in the range of 1.5 mPa·s to 15 mPa·s (20° C.), and the printing method further comprises a step of (6) drying performed during and/or after the printing.

2. The printing method according to claim 1, wherein the achromatic ink is black, the achromatic ink is composed of two or more black inks having different darkness, and at least one of the black inks is composed of surface-treated carbon black.

3. The printing method according to claim 2, wherein the chromatic color includes not only process colors but also special colors, and the special colors are orange and green.

4. The printing method according to claim 1, wherein the chromatic ink, achromatic ink, and resin ink all contain a silicon surfactant and an acetylene glycol surfactant that has an HLB value equal to or less than 6.

5. The printing method according to claim 1, wherein the chromatic ink, achromatic ink, and resin ink simultaneously contain two or more kinds of glycol-mono-ether-based water-soluble organic solvents and alkyldiol-based water-soluble organic solvents all of which have an octanol/water partition coefficient of higher than 0.1 as well as a water-soluble polymer that contains a vinyl lactam.

6. A printer comprising (a) an aqueous ink set that includes a chromatic ink and/or an achromatic ink and a resin ink that contains no colorants but contains at least resin particles; the chromatic ink and the achromatic ink each contain at least a water-insoluble colorant, a water-soluble resin component and/or a water-insoluble resin component, a water-soluble penetrating solvent, and a surfactant; the resin ink contains at least thermoplastic resin s articles that are insoluble in water but compatible with water-soluble solvents for resins as well as a water-soluble solvent for resins, and the content ratio of the resin particles is equal to or higher than that of the colorants contained in the chromatic ink and the achromatic ink; the content ratio of nonvolatile components contained in the resin ink is equal to or lower than ¼ of that of the resin component contained in the resin ink; the printing resolution per color is equal to or greater than 360 dpi (dots per inch), the ratio of the resolution of an inkjet nozzle to the printing resolution is in the range of 1 to 2, and the ink viscosity is in the range of 1.5 mPa·s to 15 mPa·s (20° C.); and (b) a heater such that the printer can carry out the printing method according to claim 1.

* * * * *